May 18, 1926.
L. M. DRUST
1,585,541
HYDRAULIC BRAKE COUPLING
Filed Oct. 23, 1925    2 Sheets-Sheet 1
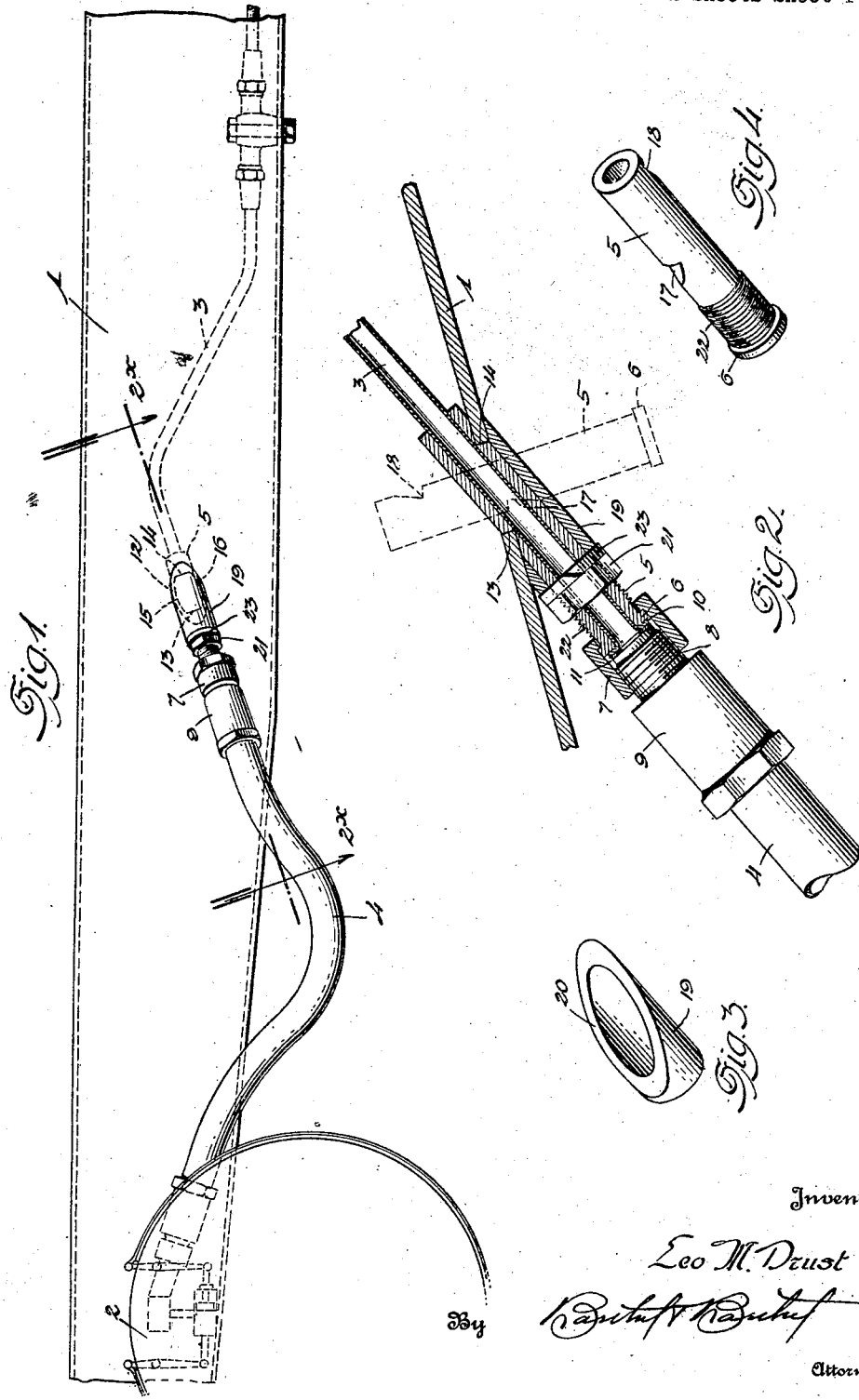
Inventor:
Leo M. Drust
By
Attorneys

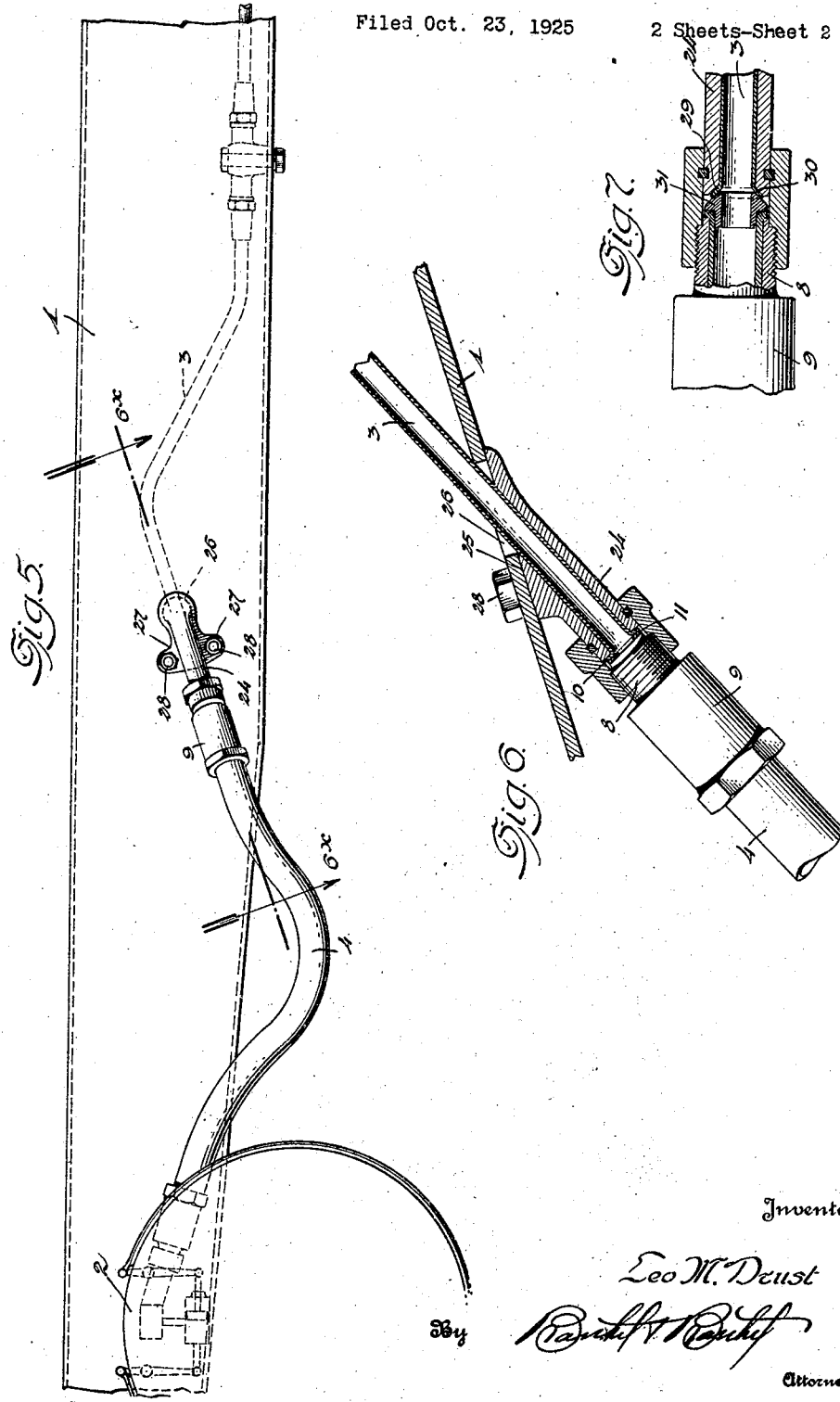

Patented May 18, 1926.

1,585,541

UNITED STATES PATENT OFFICE.

LEO M. DRUST, OF DETROIT, MICHIGAN, ASSIGNOR OF ONE-HALF TO JAMES H. MYLER, OF DETROIT, MICHIGAN.

HYDRAULIC-BRAKE COUPLING.

Application filed October 23, 1925. Serial No. 64,315.

This invention relates to the fluid line assembly of hydraulic brake systems in vehicles, and more particularly to the couplings forming an important part of the line assembly whereby communication is established between a source of fluid under pressure and a hydraulic brake, and in practice it has been found desirable to provide for the passage of the fluid carrying line through the side member of the chassis frame to the brake drum. This has presented construction problems which it has been an endeavor to meet adequately, in view of the fact that, especially in the manufacture of automobiles, production is a matter of considerable importance and the saving of time in applying or assembling an apparatus in an automobile together with efficiency and durability in the assembled apparatus is greatly to be desired.

In order to provide for fluid communication through the chassis frame it has been found advisable from a standpoint of durability to provide some form of coupling at the frame admitting of a conduit being connected thereto on the inner side of the frame and a hose on the outer side of the frame, but such couplings have been more or less complicated and have required some little time to secure in position with consequent expense in their application and have also required the exercise of an undue amount of care to ensure a joint being formed which will be continuously leakproof.

An object of the present invention is to provide a much simpler form of coupling than those heretofore proposed, which improved coupling provides a very effective securing together of the hydraulic conduit and hose and admits of its being secured from the outside of the chassis frame in a very rigid manner and with such simplicity that a substantial saving of time may be effected in the assembling of the coupling on the frame and the connecting together of the conduit and hose.

A further object is to substantially reduce the number of joints and packings or gaskets required at the frame in the coupling together of the said conduit and hose, the invention further contemplating the passing of the conduit through an orifice in the frame and its attachment to the hose by a simple coupling unit as distinguished from a compound unit involving more than one joint, together with the adequate supporting of the conduit at the frame in a manner eliminating danger of friction or impact between the conduit and the frame where the said conduit passes through the said orifice.

The invention further aims to utilize the end of the conduit entering the coupling as a gasket or as an auxiliary to a gasket whereby an effective sealing of the connection is secured and also whereby the conduit is firmly held against withdrawal from the coupling.

Still further objects subsidiary to or resulting from the aforesaid objects, or from the construction or operation of the invention as it may be carried into effect, will become apparent as the said invention is hereinafter further disclosed.

In carrying the said invention into effect, I may provide an orifice through the side frame or other member of the chassis and extend the hydraulic conduit, which is usually of copper, outwardly through such orifice at an angle to the frame and in the direction of the brake which it is intended to supply, the projecting end of the said conduit being passed through the bore of one member of a coupling, and flanged over the end thereof. To this end of the said coupling member is secured another coupling member forming the end of a flexible hose by means of a coupling nut which draws the second coupling member into firm engagement with the flanged end of the conduit. The first coupling member is rigidly secured to the outer side of the frame and according to one form of the invention may be notched on opposite sides, the notches being arranged in an oblique plane to the axis of the coupling member and the orifice in the frame so shaped that the said notched coupling member may be passed thereinto and then moved to its required angular position relative to the frame whereupon the margins of the opening in the frame will obliquely embrace the said coupling member and engage in the said notches. In this case I propose to provide said notched coupling member with a sleeve having one face cut at an angle corresponding to the angle of the said coupling member relative to the frame and with a securing nut by means of which the said sleeve may be held in abutment with the frame to retain the said coupling member against displacement. Or the said coupling member may be otherwise secured to the outer side of the frame.

All of which is more particularly described and ascertained hereinafter, by way of example, having reference to the accompanying drawings, wherein—

Figure 1 is a fragmentary elevation of the side frame of an automobile chassis illustrating my improved method of assembling and mounting a conduit and hose thereon;

Figure 2 is a detail sectional view taken on the line 2ˣ—2ˣ, Figure 1;

Figure 3 is a detail perspective view of the locking sleeve removed;

Figure 4 is a detail perspective view of the notched coupling member;

Figure 5 is a similar view to Figure 1, illustrating a modified form of the invention;

Figure 6 is a detail sectional view taken on the line 6ˣ—6ˣ, Figure 5, and

Figure 7 is a fragmentary sectional detail view showing a modified connection between the coupling members.

Similar characters of reference indicate similar parts in the several figures of the drawings.

1 indicates part of the side frame of an automobile chassis, and 2 indicates a hydraulic brake to which oil or other suitable fluid under pressure is supplied from some point within the frame by means of a metal conduit 3 and flexible hose 4, the said conduit being interior of the frame and the flexible hose exterior thereto, and it is to the manner of connecting the conduit to the hose and of mounting the connecting means on the frame that this invention refers.

In the arrangement, Figures 1 to 4, the method of connecting the conduit to the hose calls for a tubular coupling member 5 having a flanged end 6 upon which is rotatably mounted a coupling nut 7 adapted to receive the nipple 8 of a coupling member 9 secured to the end of the hose 4, the bore of the first mentioned coupling member 5 being of a size adapted to receive the end portion of the conduit 3 which is passed therethrough and flanged as at 10 to overlie the end face of the said coupling member 5.

The extremity of the nipple 8 of the coupling member 9 is preferably provided with a gasket 11 which when the two coupling members are secured together by the nut 7 is firmly engaged between the said nipple 8 of the coupling member 9 and the flanged portion 10 of the conduit 3, so that such flanged portion 10 cooperates with the gasket 11 in sealing the connection so established. Of course, if the gasket 11 were omitted then the extremity of the said nipple 8 of the coupling member 9 could be brought into engagement directly with the flanged end of the conduit 3, and, as this is usually of a somewhat soft metal such as copper, a tight joint could also be secured in this way.

It is obvious that when the two parts of the coupling member are secured together the engagement with the flange of the conduit also effectively secures the said conduit tightly between the coupling members and prevents its displacement or movement in a manner which might result in leakage at the coupling.

The said coupling member 5 is rigidly secured to the frame in a novel and effective manner. For its reception an orifice 12 is formed in the said frame, said orifice being elongated in the direction which the coupling member is required to lie and of a contour providing shoulders 13 and 14 at opposite ends thereof, the intermediate walls of the said orifice being arcuate as at 15 and 16.

The coupling member 5 is provided with notches or recesses 17 and 18 arranged relatively at an angle to the axis of the said coupling member corresponding to the angle which the said coupling member is to present to the frame 1 in which it is mounted, the said recesses being spaced apart at a distance corresponding to the dimension between the shoulders 13 and 14 of the orifice 12. This arrangement admits of the said coupling member 5 being applied to the frame by simply passing it partly through the said orifice, as indicated in dotted lines in Figure 2, and then swinging it to the angle shown in full lines in the said figure, whereupon the shoulders 13 and 14 of the orifice engage the notches 17 and 18 of the coupling member 5 and the arcuate walls 15 and 16 of the said orifice obliquely embrace the coupling member 5.

The said coupling member 5 is then incapable of longitudinal movement in the frame in either direction, due to the engagement of the shoulders in the notches, and to secure the said coupling member against angular displacement I mount thereon a sleeve 19 having one of its faces 20 cut at an angle corresponding to the relative angle of the coupling member to the frame, and lock the said sleeve with its face 20 in engagement with the frame by means of a securing nut 21 mounted upon a threaded portion 22 of the coupling member 5, 23 being a spring washer preferably interposed between the said nut 21 and the opposing end of the sleeve 19.

This arrangement ensures a very rigid mounting of the said coupling member 5 in the frame and incidentally a rigid mounting of the coupled end of the conduit 3, eliminating the necessity of couplings or gaskets on the inner side of the frame and permitting of the attachment and assembly of the means coupling the conduit to the hose entirely on the outer side of the said frame, whereby such coupling and assembly may be quickly and securely effected with a decided saving of time over the methods hitherto adopted and with an assurance of durability which is very desirable.

In the modified form shown in Figures 5 and 6, a coupling member 24 is shown, taking the place of the coupling member 5 of the previously described arrangement, the said member 24 receiving the conduit 3 in the same manner as the said member 5, but differing therefrom in that it does not necessarily extend through the orifice and is provided with an inclined face 25 adapted to abut the face of the frame 1 about or adjacent to the orifice 26 through which the conduit 3 extends.

The said member 24 is provided with laterally extending lugs 27 through which bolts or cap screws 28 may be passed for the securing of the said member 24 in position on the frame. This arrangement also admits of application without difficulty to the frame and effectively lends itself to the coupling together and mounting of the conduit and hose in the manner desired, eliminating the disadvantages attending previously adopted methods wherein further coupling means within the frame have been utilized.

In Figure 7 the coupling end of the member 24 is shown as being provided with a beveled face 29 and the end of the conduit 3 flared at 30 to lie against said face. This admits of a conical member, such as a standard S. A. E. ferrule 31 being inserted between the two coupling members ensuring a very tight joint.

This invention may be developed within the scope of the following claims without departing from the essential features of the said invention, and it is desired that the specification and drawings be read as merely illustrative and not in a limiting sense except as necessitated by the prior art.

What I claim is:

1. In a fluid line assembly for hydraulic brakes, the combination with a vehicle frame having an orifice therein, a conduit within said frame, a flexible hose exterior to said frame, of coupling means for said conduit and said hose comprising a coupling member secured at an angle to the exterior of said frame, said conduit extending at a similar angle through said orifice into said coupling member, and a common means exterior to said frame engaging said hose with said coupling member and securing the end of said conduit in said member.

2. In a fluid line assembly for hydraulic brakes, the combination with a vehicle frame having an orifice therein, a conduit within said frame, and a flexible hose exterior to said frame, of coupling means for said conduit and said hose comprising a coupling member in which said conduit is secured, said member being provided with means engaging said frame about said orifice positioning said member at an angle to said frame, means securing said member exterior to said frame, and means securing said hose to said conduit.

3. In a fluid line assembly for hydraulic brakes, the combination with a vehicle frame having an orifice therein, a conduit within said frame, and a flexible hose exterior to said frame, of coupling means for said conduit and said hose comprising a coupling member through which the end of said conduit extends, means securing said member in opposition to said orifice in said frame, and connecting means attaching said hose to said member, said connecting means also effecting the gripping of the end of said conduit between the end of said hose and the opposed end of said member.

4. In a fluid line assembly for hydraulic brakes, the combination with a vehicle frame having an orifice therein, a conduit within said frame, and a flexible hose exterior to said frame, of coupling means for said conduit and said hose comprising a coupling member through which the end of said conduit extends, the extremity of said conduit being flanged to overlie the end of said member, coupling means on said hose engaging said member and the flanged end of said conduit to form a tight joint, and means on the same side of said frame as said coupling means securing said member to said frame.

5. In a fluid line assembly for hydraulic brakes, the combination with a vehicle frame having an orifice therein, a conduit within said frame and a flexible hose exterior to said frame, of a coupling member insertable into said orifice and notched for engagement with the walls of said orifice when said member is set at an angle to said frame, means locking said coupling member in such position, and connecting means exterior to said frame securing said hose and said conduit to said coupling member.

6. The combination according to claim 5, wherein the said conduit extends through said member and is flanged to overlie the end of said member, said connecting means engaging the flanged end of said conduit between the end of said hose and the opposed end of said member.

7. In a fluid line assembly for hydraulic brakes, the combination with a vehicle frame having an orifice therein, a conduit within said frame and a flexible hose exterior to said frame, of a coupling member insertable into said orifice and notched for engagement with the walls of said orifice when said member is set at an angle to said frame, locking means preventing angular movement of said member thereby also preventing its longitudinal displacement, and connecting means securing said hose and said conduit to said coupling member.

8. In a fluid line assembly for hydraulic brakes, the combination with a vehicle frame having an orifice therein, a conduit within said frame and a flexible hose exterior to said frame, of a coupling member insertable into said orifice and notched for engagement with the walls of said orifice when said member is set at an angle to said frame, locking means in the form of a sleeve on said member having an angularly disposed face engaging said frame, means retaining said sleeve in abutment with said frame, and connecting means securing said hose and said conduit to said coupling member.

In testimony whereof I affix my signature.

LEO M. DRUST.